United States Patent
Tsuboshita et al.

(10) Patent No.: US 8,750,604 B2
(45) Date of Patent: Jun. 10, 2014

(54) IMAGE RECOGNITION INFORMATION ATTACHING APPARATUS, IMAGE RECOGNITION INFORMATION ATTACHING METHOD, AND NON-TRANSITORY COMPUTER READABLE MEDIUM

(75) Inventors: Yukihiro Tsuboshita, Kanagawa (JP); Noriji Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 189 days.

(21) Appl. No.: 13/478,681

(22) Filed: May 23, 2012

(65) Prior Publication Data

US 2013/0142420 A1    Jun. 6, 2013

(30) Foreign Application Priority Data

Dec. 6, 2011    (JP) ................................. 2011-267118

(51) Int. Cl.
*G06K 9/62*    (2006.01)
*G06K 9/72*    (2006.01)

(52) U.S. Cl.
USPC ........................... 382/159; 382/160; 382/228

(58) Field of Classification Search
None
See application file for complete search history.

(56) References Cited

U.S. PATENT DOCUMENTS

| | | | | |
|---|---|---|---|---|
| 8,131,107 B2 * | 3/2012 | Sun et al. | ...................... | 382/272 |
| 2009/0164479 A1 * | 6/2009 | Kashima | ....................... | 707/100 |
| 2010/0098343 A1 * | 4/2010 | Perronnin et al. | ............ | 382/224 |
| 2011/0202487 A1 * | 8/2011 | Koshinaka | ....................... | 706/12 |
| 2011/0295567 A1 * | 12/2011 | Thiesson et al. | ................... | 703/2 |
| 2012/0201464 A1 * | 8/2012 | Fukui et al. | ................... | 382/195 |

FOREIGN PATENT DOCUMENTS

| | | |
|---|---|---|
| JP | 9-231366 A | 9/1997 |
| JP | 2004-109105 A | 4/2004 |

* cited by examiner

*Primary Examiner* — Stephen R Koziol
*Assistant Examiner* — Jonathan S Lee
(74) *Attorney, Agent, or Firm* — Sughrue Mion, PLLC (57) ABSTRACT

An image recognition information attaching apparatus includes a retrieving unit that retrieves image information on a per piece basis of identification information, from the image information having the identification information associated thereto in advance, a generator unit that generates feature information from the image information retrieved by the retrieving unit, and a learning unit that provides a learning result by learning a relation between the feature information generated by the generator unit and the identification information of the image information corresponding to the feature information, using a stochastic model including a mixture of a plurality of probability distributions.

4 Claims, 6 Drawing Sheets

IMAGE RECOGNITION INFORMATION ATTACHING APPARATUS, IMAGE RECOGNITION INFORMATION ATTACHING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-267118 filed Dec. 6, 2011.

BACKGROUND (i) Technical Field

The present invention relates to an image recognition information attaching apparatus, an image recognition information attaching method, and a non-transitory computer readable medium.

(ii) Related Art

One of related art image recognition information attaching apparatuses learns a relation between feature information and identification information (hereinafter referred to as a "label") in advance if the identification information that is attached in accordance with the feature information resulting from image information or the like is prepared in advance. In accordance with the learning results, the image recognition information attaching apparatus recognizes the label to which input image information belongs.

SUMMARY

According to an aspect of the invention, an image recognition information attaching apparatus is provided. The image recognition information attaching apparatus includes a retrieving unit that retrieves image information on a per piece basis of identification information, from the image information having the identification information associated thereto in advance, a generator unit that generates feature information from the image information retrieved by the retrieving unit, and a learning unit that provides a learning result by learning a relation between the feature information generated by the generator unit and the identification information of the image information corresponding to the feature information, using a stochastic model including a mixture of a plurality of probability distributions, the learning unit calculating, from a first variable determined from the feature information belonging to one of the probability distributions, and a variable describing a probability distribution determined from a set of the feature information resulting from all the image information retrieved by the retrieving unit regardless of the content of the identification information, a second variable in accordance with a contribution ratio responsive to a density of the feature information belonging to the one of probability distributions, and learning the relation using a distribution described by the second variable.

BRIEF DESCRIPTION OF THE DRAWINGS

Exemplary embodiments of the present invention will be described in detail based on the following figures, wherein.

DETAILED DESCRIPTION

Figure 1:
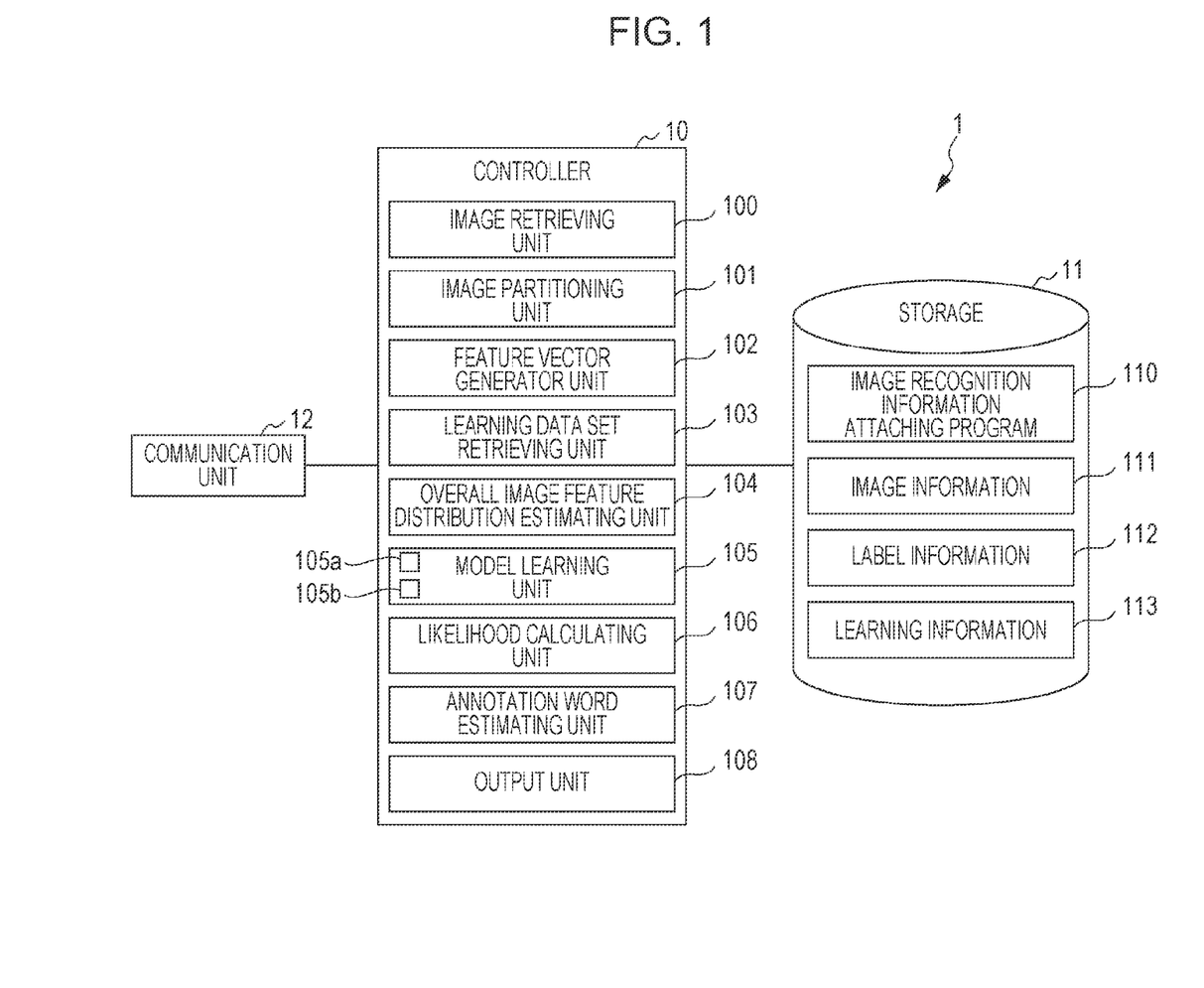
FIG. 1 illustrates an example of an image recognition information attaching apparatus of one exemplary embodiment of the present invention.

FIG. 1 illustrates a configuration of an image recognition information attaching apparatus 1 of an exemplary embodiment of the present invention.

The image recognition information attaching apparatus 1 includes controller 10, storage 11, and communication unit 12. The controller 10 controls elements including a central processing unit (CPU), and executes a variety of programs. The storage 11 includes storage units such as a hard disk drive and flash memory. The communication unit 12 communicates with the outside via a network.

An image input via the communication unit 12 may include as objects a "river," a "mountain," a "child," and the like. Words such as a "river," a "mountain," and a "child" are hereinafter referred to as annotation words. The image recognition information attaching apparatus 1 attaches to the image information the annotation word as identification information (hereinafter referred to as a "label"). The image recognition information attaching apparatus 1 performs a learning process using learning image information with a label attached thereto in advance and stored on the storage 11 or the like.

The controller 10 executes an image recognition information attaching program 110 to be discussed, and thus functions as image retrieving unit 100, image partitioning unit 101, feature vector generator unit 102, learning data set retrieving unit 103, overall image feature distribution estimating unit 104, model learning unit 105, likelihood calculating unit 106, annotation word estimating unit 107, and output unit 108.

In a learning process, the image retrieving unit 100 selects and retrieves image information for learning from image information 111 stored on the storage 11. In estimating the label, the image retrieving unit 100 retrieves image information input from an external terminal apparatus via the communication unit 12.

The image partitioning unit 101 partitions the image information retrieved by the image retrieving unit 100 and the image information 111 for learning stored on the storage 11 into multiple regions, thereby generating partial segments. The image partitioning unit 101 may use a method of partitioning the image information in accordance with rectangles arranged in a mesh, or a method of defining near and similar pixels as belonging to the same segment in accordance with a clustering technique, such as k-nearest neighbor algorithm.

The feature vector generator unit 102 generates a feature vector from each of the partial segments generated by the image partitioning unit 101, using a method of Gabor filter, or a method of extracting feature quantity such as RGB, normalized RG, CIELAB, or the like. The feature vector is one example of the feature information.

The learning data set retrieving unit 103 retrieves from the image information 111 image information that the same label is imparted to, and retrieves as a learning data set a set of feature vectors included in the retrieved image information.

The learning data set retrieving unit 103 also retrieves a feature vector set (hereinafter referred to as a "universal model") resulting from all the image information 111 regardless of the content of the label. The selection of the learning data set is not limited to a method of retrieving all the learning data. For example, if an amount of learning data is extremely large, another method may be used. For example, in one method, data elements are randomly extracted from all the learning data until a specified number of data elements are obtained.

The overall image feature distribution estimating unit 104 learns the universal model as a prior probability model, and estimates learning results (hereinafter referred to as an "overall image feature distribution").

The model learning unit 105 learns the learning data set retrieved by the learning data set retrieving unit 103, and includes a data density estimating unit 105a and a parameter optimization unit 105b.

The data density estimating unit 105a estimates a data density of data in a data region of a given label. The "data region" herein refers to a region in a space of the feature vectors belonging to a k-th Gaussian distribution if the entire space of the feature vectors is segmented into K Gaussian distributions in accordance with Gaussian mixture model (GMM) (see FIG. 3A). More information is provided in detailed in learning process described below. The "data density" refers to a density of data included in the data region of the k-th Gaussian distribution.

The parameter optimization unit 105b calculates and optimizes a second variable from a first variable determined from the feature information belonging to the data region, and a variable describing the overall feature distribution, in accordance with a contribution ratio. The contribution ratio is determined by the data density of the data region estimated by the data density estimating unit 105a.

The likelihood calculating unit 106 calculates the likelihood of any label of the feature vector of the image information retrieved by the image retrieving unit 100.

The annotation word estimating unit 107 estimates an annotation word corresponding to the label having a high likelihood, as the identification information of the input image information.

The output unit 108 outputs, to a display unit, a printer, the storage 11, or the like, several annotation words having high likelihood, from among those estimated by the annotation word estimating unit 107. In this way, the output unit 108 presents an annotation word to be output according to the likelihood. The user of the image recognition information attaching apparatus 1 may select an appropriate annotation word from the presented annotation words according to the likelihood.

The storage 11 stores image recognition information attaching program 110, image information 111, label information 112, learning information 113, and the like. The image recognition information attaching program 110 causes the controller 10 to operate as the elements of the controller 10. The image information 111 is used in the learning process. The label information 112 associates the image information included in the storage 11 with the label. The learning information 113 is the learning result of the model learning unit 105.

Referring to the drawings, the operations of the image recognition information attaching apparatus 1 are described in terms of a basic learning operation, a detailed learning operation, and an annotation estimation operation.

Figure 4:
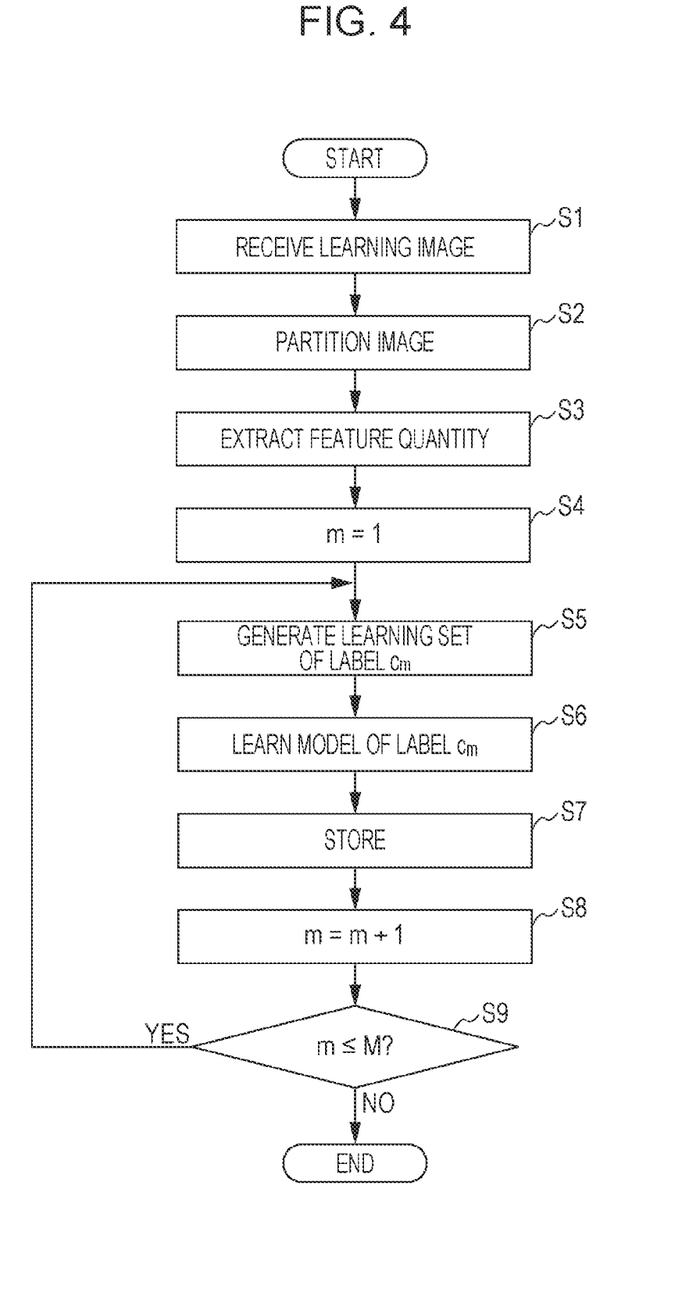
FIG. 4 is a flowchart illustrating an operation of the image recognition information attaching apparatus.

FIG. 4 is a flowchart illustrating the operation of the image recognition information attaching apparatus 1.

Figure 2A:
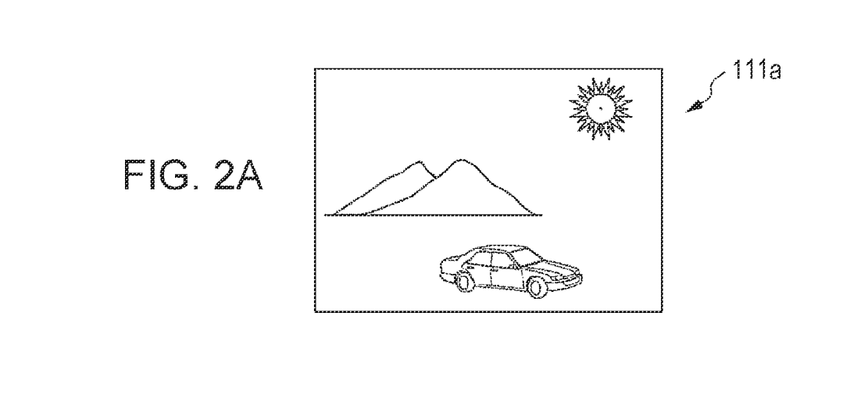
FIGS. 2A and 2B illustrate an example of a basic learning operation.
Figure 2B:
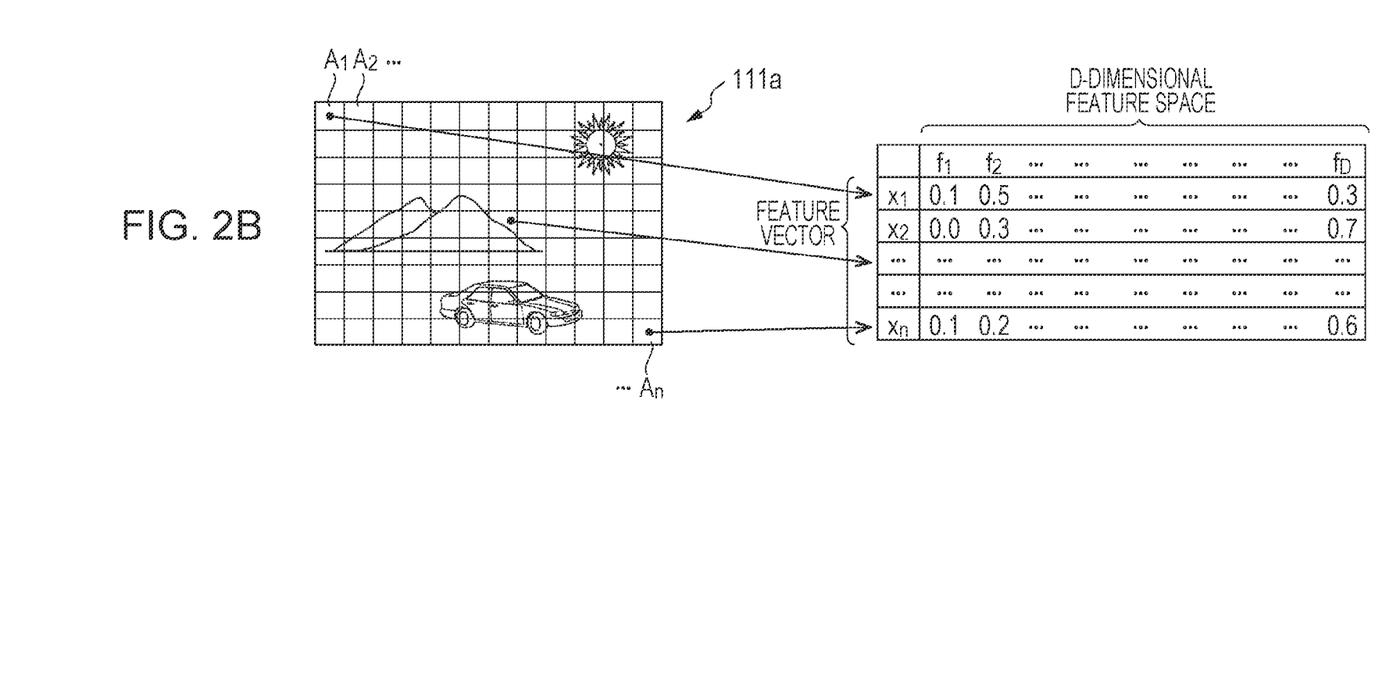

FIGS. 2A and 2B generally illustrate the basic learning operation.

The image retrieving unit 100 receives the image information 111 as the learning data from the storage 11 (S1). For example, the image information 111 includes multiple pieces of image information associated with annotation words a "mountain," a "sun," a "car," and the like as labels.

The image partitioning unit 101 partitions a display image of image information 111a illustrated in FIG. 2A as one example of the image information retrieved by the image retrieving unit 100 into n segments of FIG. 2B. The image partitioning unit 101 thus results in partial segments $A_1$-$A_n$ (S2). In one example, the display image is partitioned into rectangles arranged in a mesh. That operation may be performed on each of the multiple pieces of image information retrieved by the image retrieving unit 100.

The feature vector generator unit 102 extracts multiple feature quantities $f_1$-$f_D$ from the partial segments $A_1$-$A_n$, for example, using the Gabor filter. The feature vector generator unit 102 thus generates feature vectors $x_1, x_2, \ldots, x_n$ of the partial segments $A_1$-$A_n$, each having the feature quantities $f_1$-$f_D$ as the components thereof (S3). That operation may be performed on each of the multiple pieces of image information retrieved by the image retrieving unit 100.

The learning data set retrieving unit 103 references the label information 112, and retrieves the image information associated with a label $c_1$ (for example, the annotation word "mountain") from the image information 111. The learning data set retrieving unit 103 retrieves a set of feature vectors generated from the retrieved image information as a learning data set (S4 and S5).

The model learning unit 105 learns the learning data of the label $c_1$ retrieved by the learning data set retrieving unit 103 (S6), and stores the learning result in the learning information 113 on the storage 11 (S7).

Operations in steps S5 through S7 are performed on all the labels (M labels) (S8 and S9).

The detailed learning operation performed by the model learning unit 105 in step S6 is described in detail below.

The model learning unit 105 uses GMM as a probability generation model. Let $X=\{x_1, \ldots, x_n\}$ represent an input learning data set, and D represent the dimension of the feature vector, and Gaussian mixture model p is defined by expression (1) as follows:

$$p(X \mid c) = \prod_{i=1}^{N} p(x_i \mid c) = \prod_{i=1}^{N} \sum_{k=1}^{K} \pi_k^c N(x_i \mid \mu_k^c, \Sigma_k^c) \quad (1)$$

where N is the number of input learning data elements, and K is the number of mixture elements. Let $\pi_k^c$ represent a mixture ratio, $N(x_i|\mu_k^c, \Sigma_k^c)$ represent a D-dimensional Gaussian distribution having mean value $\mu_k^c$ and variance $\Sigma_k^c$.

The mixture ratio satisfies expression (2):

$$\sum_{k=1}^{K} \pi_k^c = 1 \quad (2)$$

The overall image feature distribution estimating unit 104 learns as a prior probability common to all the labels a model (universal model) where all the image information 111 is set as the learning data set. The model is referred to as an overall image feature distribution in the present invention. According to the exemplary embodiment, the overall image feature distribution is represented by the following GMM:

$$p_u(x_i) = \sum_{k=1}^{K} \pi_k^u N(x_i \mid \mu_k^u, \Sigma_k^u) \quad (3)$$

The mixture ratio $\pi_k^c$, the mean value $\mu_k^c$ and the variance $\Sigma_k^c$ ($1 \le k \le K$) are obtained by performing a learning process in advance through a standard expectation-maximization (EM) algorithm. The learning process is performed using a learning data set of all the labels set in a learning data setting process (or learning data set randomly extracted with no label defined).

The parameter optimization unit 105b performs a first method to correct the Gaussian distribution $N(x_i \mid \mu_k^c, \Sigma_k^c)$ corresponding to a given label using the overall image feature distribution. When the parameter optimization unit 105b calculates parameters (the mixture ratio, the mean value, and the variance) using the EM algorithm in the first method, the initial values of the parameters are those of the overall image feature distribution.

The EM algorithm has a feature of dependence on the initial value. The smaller the number of data elements is, the larger the dependence on the initial value becomes. If the reliability of the learning data is low with a small number of learning data samples, the Gaussian distribution reflecting the overall image feature distribution may be obtained. If the number of learning data samples is large, the Gaussian distribution reflecting the trend of the learning data samples more may be obtained.

The model learning unit 105 uses a second method to correct the Gaussian distribution $N(x_i \mid \mu_k^c, \Sigma_k^c)$ corresponding to a given label using the overall image feature distribution. In the second method, the model learning unit 105 uses the overall image feature distribution as a prior distribution. With a specific GMM used as a prior distribution, and the parameters of the Gaussian distribution (second variables) are calculated as follows:

$$\pi_k^c = \frac{\sum_{i=1}^{N_c} r_{ik}^c + \tau}{N_c + \tau K} \quad (4)$$

$$\mu_k^c = \frac{\sum_{i=1}^{N_c} r_{ik}^c x_i + \tau \mu_k^u}{\sum_{i=1}^{N_c} r_{ik}^c + \tau} \quad (5)$$

$$\Sigma_k^c = \frac{\sum_{i=1}^{N_c} r_{ik}^c x_i x_i^T + \tau \{\Sigma_k^u + \mu_k^u (\mu_k^u)^T\}}{\sum_{i=1}^{N_c} r_{ik}^c + \tau} - \mu_k^c (\mu_k^c)^T \quad (6)$$

where $r_{ik}^c$, called shared ratio, is a posterior distribution of mixture elements k if data $x_i$ is given, and is defined by the following expression (7):

$$\gamma_{ik}^c \equiv \frac{\pi_k^c N(x_i \mid \mu_k^c, \Sigma_k^c)}{\sum_{k=1}^{K} \pi_k^c N(x_i \mid \mu_k^c, \Sigma_k^c)} \quad (7)$$

where $\tau$ is a real constant number, and $N_c$ is the number of learning data elements of label c.

From expressions (4) through (6), it is understood that the smaller the amount of learning data is, the more the parameters (second variables) of the Gaussian distribution reflects the parameters of the overall image feature distribution.

Expression (5) may be interpreted as follows:

$$\mu_k^c = \frac{\sum_{i=1}^{N_c} r_{ik}^c}{\sum_{i=1}^{N_c} r_{ik}^c + \tau} \frac{\sum_{i=1}^{N_c} r_{ik}^c x_i}{\sum_{i=1}^{N_c} r_{ik}^c} + \frac{\tau}{\sum_{i=1}^{N_c} r_{ik}^c + \tau} \mu_k^u \quad (8)$$

$$= \rho \bar{x}_k^c + (1 - \rho) \mu_k^u$$

$$\bar{x}_k^c \equiv \frac{\sum_{i=1}^{N_c} r_{ik}^c x_i}{\sum_{i=1}^{N_c} r_{ik}^c} : \text{Sample mean} \quad (8\text{-}1)$$

value in region $k$ of label $c$ (first variable)

$$\sum_{i=1}^{N_c} \gamma_{ik}^c : \text{Data density in region } k \text{ of label } c \quad (8\text{-}2)$$

$$\rho \equiv \frac{\sum_{i=1}^{N_c} \gamma_{ik}^c}{\sum_{i=1}^{N_c} \gamma_{ik}^c + \tau} : \text{Contribution ratio in region } k \text{ of label } c \quad (8\text{-}3)$$

$$1 - \rho \equiv \frac{\tau}{\sum_{i=1}^{N_c} \gamma_{ik}^c + \tau} : \text{Contribution} \quad (8\text{-}4)$$

ratio in region $k$ of the overall image feature

Figure 3A:
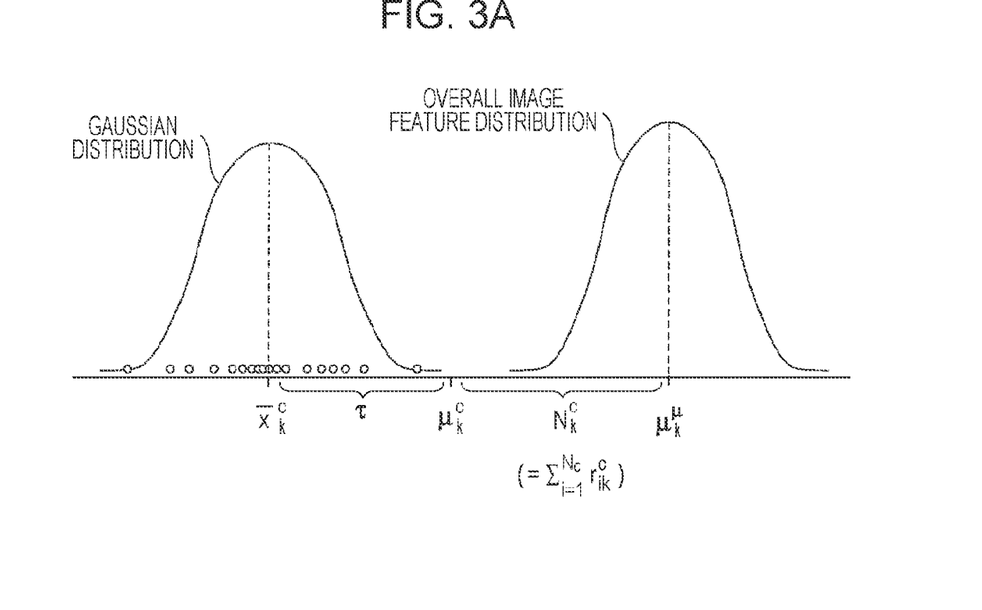
FIG. 3A illustrates a relationship of a k-th Gaussian distribution of label c, overall image feature distribution, and mean value $\mu_k^C$ determined by a model learning unit, and FIG. 3B diagrammatically illustrates distributions of feature vectors and ranges of data regions.
Figure 3B:
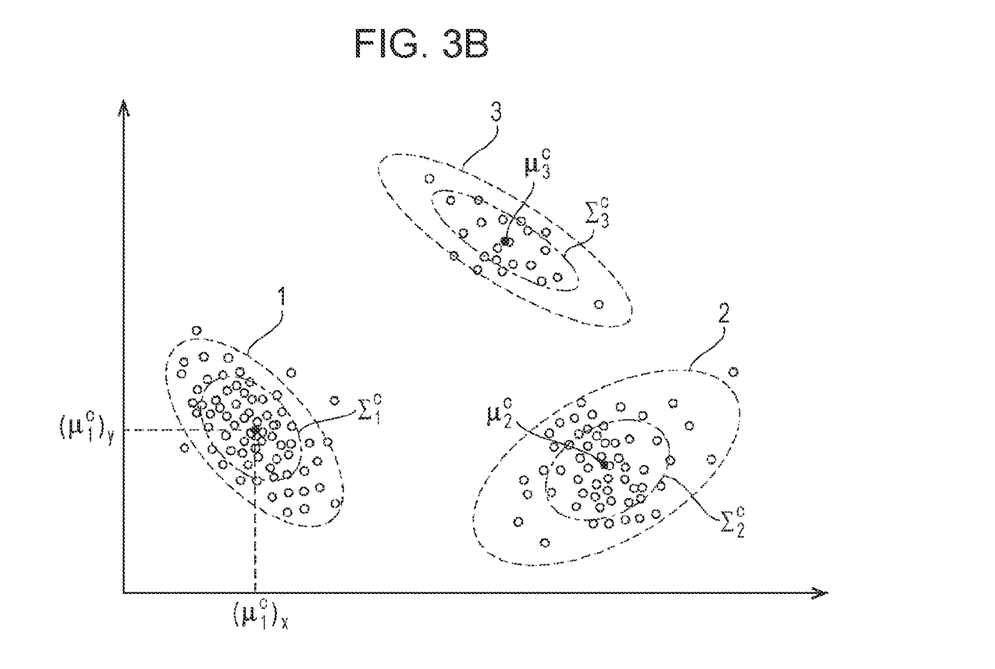

Expression (8), if represented in diagram, is illustrated in FIGS. 3A and 3B.

FIG. 3A illustrates a relationship of a k-th Gaussian distribution of label c, overall image feature distribution, and mean value $\mu_k^c$ determined by the model learning unit 105. For simplicity of explanation, the feature vector is one-dimensional, and each small blank circle represents a data sample.

The data density estimating unit 105a estimates a data density $N_k^c$ in accordance with expression (8-2). Here $\tau$ is a predetermined constant, and as the data density $N_k^c$ is smaller, the model learning unit 105 results in, as a calculation result of the mean value $\mu_k^c$ (second variable), closer to mean value $\mu_k^u$ of the overall image feature distribution. As the data density $N_k^c$ is larger, the model learning unit 105 results in, as a calculation result of the mean value $\mu_k^c$ (second variable), closer to sample mean $\bar{x}_k^c$ (first variable) of a region k of label c.

Similarly, $$\Sigma_k^c = \rho \bar{x}_k^{c2} + (1-\rho)\{\Sigma_k^u + \mu_k^u(\mu_k^u)^T\} - \mu_k^c(\mu_k^c)^T \qquad (9)$$

$$\bar{x}_k^{c2} \equiv \frac{\sum_{i=1}^{N_c} r_{ik}^c x_i x_i^T}{\sum_{i=1}^{N_c} r_{ik}^c} : \text{Root mean}$$

square of the samples in region $k$ of label $c$ where $\pi_k^c$ defines a data density of the region k of the label c as follows:

$$\pi_k^c \propto \Sigma_{i=1}^{N_c} r_{ik}^c + \tau \qquad (10)$$

If expression (10) is normalized using expression (2), expression (4) results.

In the model learning unit 105, the data density estimating unit 105a estimates the data density of the data region, and the parameter optimization unit 105b determines in response to the data density a contribution ratio that reflects the parameter of the overall image feature distribution.

If τ is given, each label c is learned using the EM algorithm.

The learning algorithm using the EM algorithm is described in detail below.

Figure 5:
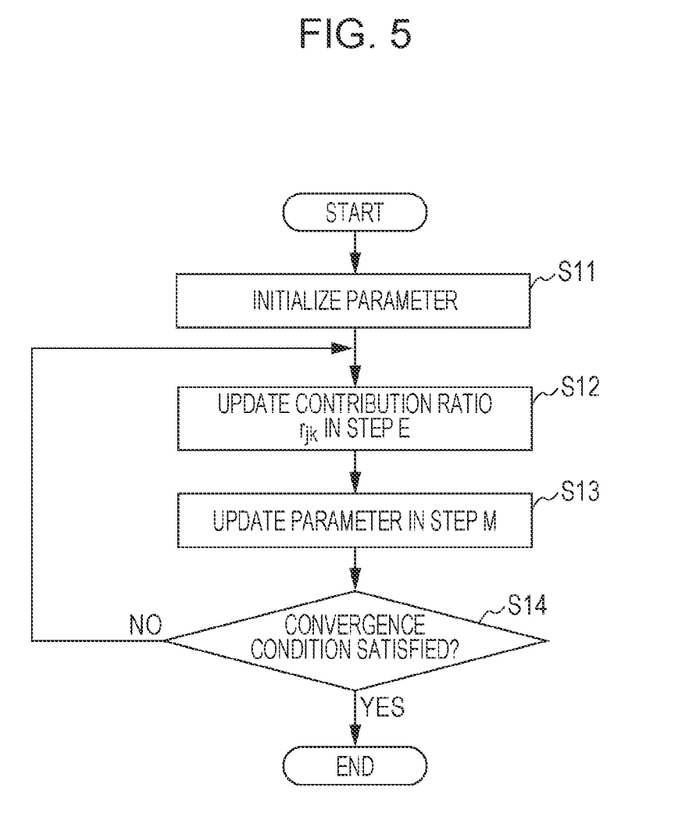
FIG. 5 is a flowchart illustrating a learning algorithm.

FIG. 5 is a flowchart illustrating the learning algorithm. FIG. 3B diagrammatically illustrates distributions of feature vectors and ranges of data regions. For simplicity of explanation, the feature vector is two-dimensional, and each small blank circle represents a data sample.

The parameter optimization unit 105b in the model learning unit 105 initializes the parameters $\{\pi_k^c, \mu_k^c, \Sigma_k^c\}$ (S11). The parameter optimization unit 105b determines the initial value of the parameter of the overall image feature distribution using the universal model.

In the results of step S11, the data sample belongs to any of the data region of the Gaussian distribution. The model learning unit 105 calculates the shared ratio $r_{jk}$ of the data sample belonging to each Gaussian distribution in E step in accordance with expression (7).

The model learning unit 105 then updates the parameters $\{\pi_k^c, \mu_k^c, \Sigma_k^c\}$ in M step in accordance with expressions (4) through (6) (S13). In the results of step S13, the data sample belongs to any of the data regions of the Gaussian distributions governed by the update parameters.

The model learning unit 105 determines whether a convergence condition is satisfied or not (S14). If a change in logarithmic likelihood is equal to or lower than a predetermined value (yes from S14), the model learning unit 105 completes the calculation step thereof. If the change in the logarithmic likelihood is higher than the predetermined value (no from S14), the model learning unit 105 returns to step S12.

The model learning unit 105 stores learned parameters $\{\pi_k^c, \mu_k^c, \Sigma_k^c\}$ of the model of each label on the storage 11 as the learning information 113.

Figure 6:
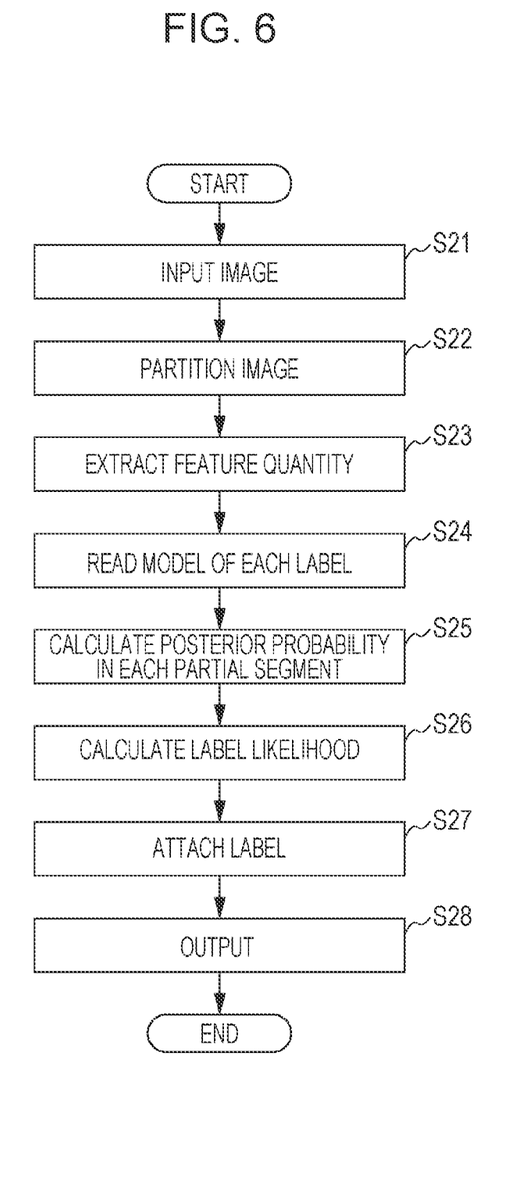
FIG. 6 is a flowchart illustrating an operation of the image recognition information attaching apparatus.

FIG. 6 is a flowchart illustrating the annotation estimation operation.

The image retrieving unit 100 retrieves via the communication unit 12 image information input from the outside as a label estimation target (S21).

The image partitioning unit 101 partitions the image into n segments, thereby generating the partial segments (S22).

The feature vector generator unit 102 extracts multiple feature quantities from each of the partial segments, and generates respectively for the partial segments the feature vectors $x_1, x_2, \ldots, x_n$ having these feature quantities as the components thereof (S23).

The likelihood calculating unit 106 reads from the learning information 113 the model of each label learned in step S6 (S24). More specifically, the likelihood calculating unit 106 reads from the storage 11 the parameters $\{\pi_k^c, \mu_k^c, \Sigma_k^c\}$ of the model and then expands the parameters $\{\pi_k^c, \mu_k^c, \Sigma_k^c\}$ onto a memory (not illustrated).

The likelihood calculating unit 106 calculates the posterior probability of the feature vector of each partial segment (S25). When the set $X=\{x_1, \ldots, x_n\}$ of the feature vectors extracted from an input image I to be predicted is provided, the likelihood calculating unit 106 calculates the posterior probability p(c|X) of the label c using Baye's theorem as follows:

$$p(c|X) = p(c|x_1 \ldots x_n) = \frac{p(c)}{p(x_1 \ldots x_n)} \prod_{i=1}^{n} p(x_i|c) \qquad (11)$$

where p(c) is the posterior probability of the label c, and relative frequency in the learning data set is used for p(c). $p(x_1 \ldots x_n)$ is the posterior distribution of the feature vector set, and takes a constant value with respect to label. The logarithmic likelihood of the label c of the image I is expressed with the constant portion thereof removed as follows:

$$\log p(c) + \sum_{i=1}^{n} \log p(x_i|c) \qquad (12)$$

The larger the magnitude of expression (12) is, the better the label is for the image I. Several results of expression (12) in the order of the large to the small magnitude are used as labels for the image I (annotation words).

The likelihood calculating unit 106 calculates the likelihood of the feature vector $x_i$ of a partial image of a given label c (S26).

When the likelihood is calculated, the annotation word estimating unit 107 retrieves five labels, for example, in the order of the large to the small magnitude, and attaches annotation words to the labels as the identification information of the image information (S27).

The output unit 108 outputs annotation word estimation results to a predetermined output device (not illustrated) such as a display, a printer, or a hard disk (S28).

The present invention is not limited to the above-described exemplary embodiment, and may be changed into a variety of modifications within the scope of the present invention.

The image recognition information attaching program 110 used in the exemplary embodiment may be read onto the storage 11 within the image recognition information attaching apparatus 1 from a recording medium such as compact disk read-only memory (CD-ROM), or may be downloaded onto the storage 11 within the image recognition information attaching apparatus 1 from a server or the like connected to a network such as the Internet. The storage 11 may be arranged external to the image recognition information attaching apparatus 1. The external storage 11 and the image recognition information attaching apparatus 1 may be connected to via the network. Part or whole of the image retrieving unit 100 through the output unit 108 may be implemented using a hardware structure such as an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image recognition information attaching apparatus comprising:
    a retrieving unit that retrieves image information on a per piece basis of identification information, from the image information having the identification information associated thereto in advance;
    a generator unit that generates feature information from the image information retrieved by the retrieving unit; and
    a learning unit that provides a learning result by learning a relation between the feature information generated by the generator unit and the identification information of the image information corresponding to the feature information, using a stochastic model including a mixture of a plurality of probability distributions, the learning unit calculating, from a first variable determined from the feature information belonging to one of the probability distributions, and a variable describing a probability distribution determined from a set of the feature information resulting from all the image information retrieved by the retrieving unit regardless of the content of the identification information, a second variable in accordance with a contribution ratio responsive to a density of the feature information belonging to the one of probability distributions, and learning the relation using a distribution described by the second variable.

2. An image recognition information attaching method comprising:
    retrieving image information on a per piece basis of identification information, from the image information having the identification information associated thereto in advance;
    generating feature information from the retrieved image information; and
    learning a relation between the generated feature information and the identification information of the image information corresponding to the feature information, using a stochastic model including a mixture of a plurality of probability distributions, the learning calculating, from a first variable determined from the feature information belonging to one of the probability distributions, and a variable describing a probability distribution determined from a set of the feature information resulting from all the image information retrieved regardless of the content of the identification information, a second variable in accordance with a contribution ratio responsive to a density of the feature information belonging to the one of probability distributions, and learning the relation using a distribution described by the second variable.

3. A non-transitory computer readable medium storing a program causing a computer to execute a process for attaching image recognition information, the process comprising:
    retrieving image information on a per piece basis of identification information, from the image information having the identification information associated thereto in advance;
    generating feature information from the retrieved image information; and
    learning a relation between the generated feature information and the identification information of the image information corresponding to the feature information, using a stochastic model including a mixture of a plurality of probability distributions, the learning calculating, from a first variable determined from the feature information belonging to one of the probability distributions, and a variable describing a probability distribution determined from a set of the feature information resulting from all the image information retrieved regardless of the content of the identification information, a second variable in accordance with a contribution ratio responsive to a density of the feature information belonging to the one of probability distributions, and learning the relation using a distribution described by the second variable.

4. The non-transitory computer readable medium according to claim 3, wherein in the learning, an initial value of the variable of the one of the probability distributions is an initial value determined in accordance with the set of the feature information resulting from the image information retrieved regardless of the content of the identification information.

* * * * *